July 27, 1926.
W. HARDMAN
CLUTCH
Filed Feb. 7, 1925
1,594,259
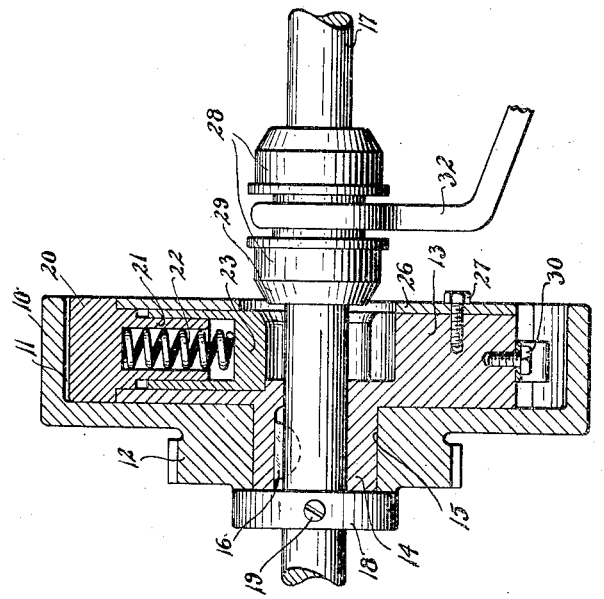
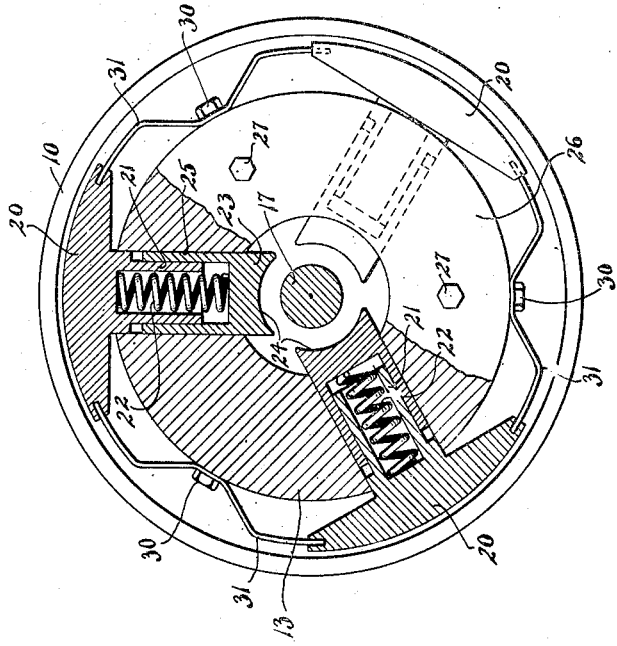
Inventor
William Hardman,
By Victor J. Evans
Attorney Patented July 27, 1926.

1,594,259

UNITED STATES PATENT OFFICE.

WILLIAM HARDMAN, OF LEAVENWORTH, KANSAS.

CLUTCH.

Application filed February 7, 1925. Serial No. 7,608.

This invention relates to improvements in clutches, the general object being to provide a novel form of clutch which owing to its peculiar construction will perform equally well as a dry clutch or in oil.

Another object of the invention is the provision of retractile means included between the meeting end portions of the clutch shoes which tend to keep said shoes from frictionally engaging the clutch band or rim when the same is rotated and out of engagement with the same whereby longevity of the clutch is assured.

With the above and other objects in view, the invention further includes the following novel features and details of construction, to be hereinafter more fully described, illustrated in the accompanying drawing and pointed out in the appended claims.

In the drawing:—

Figure 1 is a front elevation of the clutch with parts broken away showing the specific mounting of the clutch shoes and expanding means therefor.

Figure 2 is a longitudinal sectional view taken through the clutch and showing the specific mountings of the retractile expanding means and the various mountings of the clutch as applied to a crank-shaft.

Referring to the drawing in detail, wherein like characters of reference denote corresponding parts, the reference character 10 indicates the female member of the clutch and includes a channeled portion 11 upon the inner face thereof and a gear 12 formed integral upon the opposite side thereof. Fitted within the channel portion 11 of the female member 10 is a male member 13 which has a reduced hollow extension 14 which extends through an opening 15 provided in the rear face of the female member 10 and centrally through the gear 12. This hollow extension is keyed as at 16 to a shaft 17 which extends centrally through the male and female members of the clutch and to prevent movement of the female member 10 upon the shaft and the male member 13 there is provided a collar member 18 upon the shaft which is held thereon against accidental movement through the instrumentality of a set screw 19. It will thus be seen that the male member 13 is rigidly secured to the shaft 17 and that the female member 10 and gear 12 being formed integral will be free for frictional rotation.

In order to provide associating and rigid connecting means between the inner wall of the channel portion 11 of the female member 10 and the outer sides of the male member 13 there is provided a plurality of expansion shoes 20 which are preferably arcuate shaped and have their upper sides correspondingly shaped with the inner walls of the channel portion 11 of the female member 10. They, in turn, have extending centrally from the inner sides thereof reduced hollow extension male members 21. The said reduced hollow male members 21 which extend from the under sides of the arcuate shaped expansion shoes each receives therein a compression spring 22 which has its opposite end portion extending beyond the inner end of the male member 21 and positioned within the lower portion of a telescopic female member which is correspondingly shaped as at 23; the lower end portions of the female members 23 are substantially curved or arcuate shaped as at 24 and extend in spaced relation with respect to the shaft 17.

These male members 21 and female members 23 which are telescopic and receive the compression springs 22 therein are fitted within cutout portions 25 provided in the male member 13 and are adapted to have their outer sides lie flush therewith. In order to provide suitable means for holding the said sections within the cutout portions 25 and insure the proper operation of same, there is provided a face plate 26 which entirely covers the inner face of the male member 13 and is held thereon by a plurality of screws 27.

Mounted for sliding movement upon the shaft 17 there is provided a shifting cone 28 which has its inner end beveled as at 29 in order that the same may be easily received between the arcuate shaped end portions of the female members 23, and also to facilitate the easy insertion of the same therebetween in order that the female members 23 may be forced outwardly through the cutout portions 25 provided in the male member 13, and to compress the compression springs 22 which have their upper opposite end portions engaging the under sides of the arcuate shaped expansion shoes, to force the same outwardly with the male members 21 which are telescoped within the inner side walls of the female members 23 in order that the expansion shoes 20 may firmly engage the channel portion 11 of the female member 10.

It is commonly and generally known in the use of various sorts of clutches that there is frequent binding, dragging, and grabbing due to the centrifugal force of expansion shoes included therein which come into accidental frictional engagement with the inner walls of a female member of this type, and it is the purpose of this application to provide means in the form of retention springs which have their intermediate portions secured as at 30 to the outer edges of the male member 13 and at spaced intervals thereon between the end portions of the expansion shoes 20; these springs have their opposite end portions offset as at 31 and positioned within the end portions of the expansion shoes 20 in order to perform a twofold or multiple purpose in preventing the expansion shoes 20 from coming into accidental frictional engagement with the channel portion 11 of the female member 10, and also to push or force the expansion shoes with their male members 21 downwardly into the hollow portions of the female members 23 in order that the same may be disengaged from the channel portion 11 of the female member 10.

In order to provide means for shifting the shifting cone into and out of engagement with the arcuate shaped portions 24 of the female members 23 there is provided a bifurcated shifting rod 32, having a bifurcated end positioned between the shifting cones 28 in order that the cones may be easily manipulated in engaging or releasing the clutch.

The invention is susceptible of various changes in its form, proportions and minor details of construction and the right is herein reserved to make such changes as properly fall within the scope of the appended claims.

Having thus described my invention what is claimed is:—

1. A clutch of the character described comprising male and female members respectively, the male member being cylindrical in form and including a central hollow extension upon the inner side thereof, a shaft member extending therethrough and keyed thereon, the female member including a flange portion extending over the outer periphery of the male member and having a hollow reduced portion fitted over the reduced extension of the male member, a gear provided on the hollow reduced portion, a collar carried upon said shaft and engaging the corresponding end portions of the members, an apertured face plate secured to the inner face of the male member, a plurality of expansion shoes carried by the male member, telescopic sections including compression means connected to the expansion shoes, the lower end portions of said telescopic sections being arcuate shaped and in spaced relation to the outer periphery of the shaft, retention means secured to the outer periphery of the male member and having their opposite end portions secured to the end portions of the expansion shoes, and a shifting cone mounted for sliding movement upon the shaft and adapted to engage the arcuate shaped lower end portions of the telescopic sections.

2. A clutch of the character described having outer and inner sections respectively, the outer section including a flange portion and having a reduced apertured extension extending from the opposite side thereof and providing a gear upon the outer periphery thereof, an inner section fitted within the flange portion of the outer section and having a reduced hollow extension extending through the opening provided centrally of the gear, a shaft extending through the reduced extension of the inner section and keyed thereon, a collar member secured to said shaft and lying flush with the ends of the gear and extension, an apertured face plate secured to the outer side of the inner section, a plurality of expansion shoes having reduced hollow extensions extending from the inner portions thereof and adapted for reciprocation within passages provided in the inner section, a plurality of female members receiving the reduced portions of the expansion shoes, a plurality of compression springs positioned between and within the walls defined by the reduced extensions and female members respectively, a plurality of retention spring members arranged at spaced intervals upon the outer periphery of the inner section and having their outer end portions substantially offset and imbedded in the end portions of the expansion shoes, and cones mounted for sliding movement upon the shaft and adapted for engagement with the inner end portions of the female members for contracting and expanding the expansion shoes.

In testimony whereof I affix my signature.

WILLIAM HARDMAN.